UNITED STATES PATENT OFFICE.

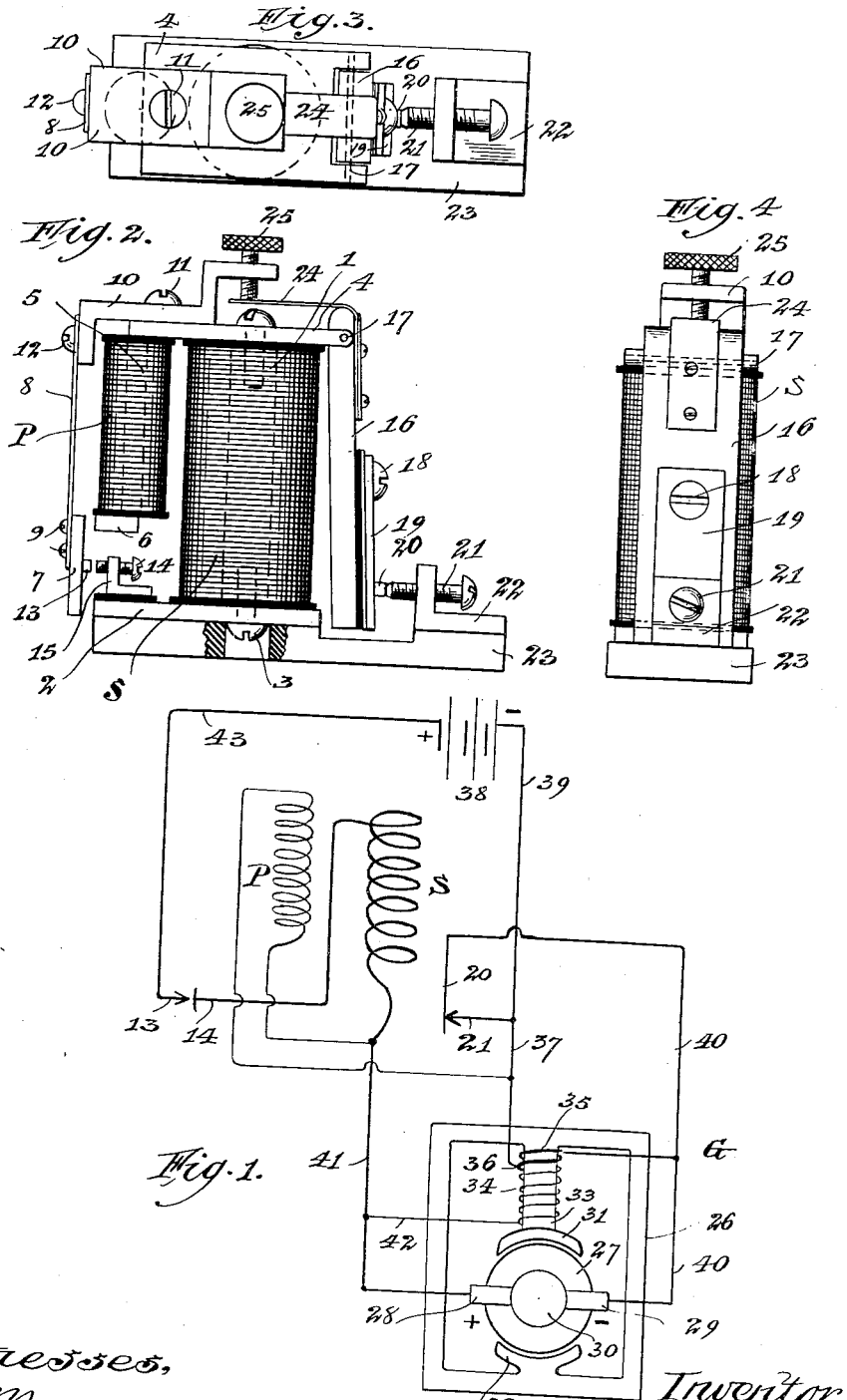
A. RICHTER.
VARIABLE SPEED DIRECT CURRENT GENERATOR.
APPLICATION FILED OCT. 22, 1913.
1,115,452.
Patented Oct. 27, 1914.

ALFRED RICHTER, OF CHICAGO, ILLINOIS.

VARIABLE-SPEED DIRECT-CURRENT GENERATOR.

1,115,452.  Specification of Letters Patent.  Patented Oct. 27, 1914.

Application filed October 22, 1913.  Serial No. 796,597.

*To all whom it may concern:*

Be it known that I, ALFRED RICHTER, a citizen of the United States, residing at Chicago, in the county of Cook and State of Illinois, have invented certain new and useful Improvements in Variable-Speed Direct-Current Generators, of which the following is a full, clear, and exact description.

This invention relates to improvements in direct-current generators used on motorcycles, automobiles or motor boats, for the purpose of keeping the storage battery fully charged.

The principal objects of the invention are to provide a system of regulation which will be adapted for use on extremely small generators, as used for instance on motorcycles; to provide a system of regulation which will be effective at the maximum speeds to which the generator will be subjected; to provide a system of regulation which will not interfere with or lower the output of the generator when operated at extremely low speeds; to provide a system which will in all cases protect the battery from overcharge, and also protect the generator from overload; to provide means for disconnecting the battery from the generator when the generator stops running, and to connect the battery to the generator when the latter reaches a definite speed; to provide a system which will be adapted for use with any kind of generator; to provide a system which can be cheaply constructed and easily maintained, and which will not readily get out of order; and in general to provide an improved system and apparatus of the character referred to.

Referring to the drawings,—Figure 1 is a diagrammatic view showing my system applied to a direct-current generator of the electromagnetic type with field windings on one pole only; Fig. 2 is a side elevation of the relay mechanism; Fig. 3 is a plan of Fig. 2; and Fig. 4 is a side elevation of Fig. 2.

Similar figures refer to similar parts throughout the several views.

Referring to Fig. 2, 1 is an iron core upon which is wound a coarse-wire winding S. At the lower end of the core is an iron plate 2 fastened to the core 1 by means of a screw 3. The upper end of the core 1 is similarly provided with an iron plate 4, on the outer end of which is fastened a small core 5. This small core 5 is provided with a shunt winding P, and on the end of this small core 5 is fixed a small iron projection 6. The ends of the iron pieces 2 and 6 thus form two poles for the cores 1 and 5. The armature 7 is adapted to be normally held away from the poles 2 and 6 by means of its supporting spring 8, to which it is attached by means of screws 9. The spring 8 is supported on a brass extension piece 10, which is attached by a screw 11 to the top plate 4. The spring 8 is rigidly connected to the piece 10 by means of a screw 12. The armature 7 is provided with a contact 13 which engages with the contact screw 14 when the armature is attracted by the poles 2 and 6, the spring 8 normally holding it out of contact therewith. The screw 14 is set in an angle piece 15 which is attached to and insulated from the heel plate 2. The other end of the top piece 4 is notched out wide enough to admit the armature 16, which is pivoted between the forks thus formed, the pivot being shown at 17. The armature 16 is long enough to be attracted by the adjacent end of the heel iron 2 when the core 1 is energized sufficiently. On the back of the armature is fastened, by means of a screw 18, a plate 19 which carries a contact 20. The contact 20 normally makes contact with the contact-screw 21, the latter being supported on a bracket 22. The bracket 22 is rigidly attached to the fiber base 23 by means of a screw not shown, the fiber base also being rigidly attached to the heel iron 2. The contact 20 is pressed up against the screw 21 positively by means of a spring 24, which is fastened onto the back of the armature 16. The free end of the spring 24 can be varied in tension by means of an adjusting screw 25, against the end of which it presses, the screw 25 being mounted in the bracket 10.

It will be seen that when the core 1 is energized by means of the winding S, the armatures 7 and 16 will both be attracted to a greater or less extent depending on the current flowing through the winding S. When the winding P is energized, however, its principal effect is to attract the armature 7, which is situated adjacent to the end of the winding, the winding P not having much effect on the armature 16 owing to the large amount of magnetic leakage, and also owing to the fact that the core 1 acts as a shunt circuit for the magnetic lines of force.

Referring now to Fig. 1, 26 represents the field magnet of a direct-current generator G of the electromagnetic type, the armature being shown at 27. The dynamo is provided with the usual brushes 28 and 29, commutator 30, pole shoes 31 and 32, the winding being shown on the single core 33. The field winding consists of a fine-wire winding 34 and a series winding 35. The latter is connected so that when energized by current flowing from the generator in a direction to charge the battery it will tend to neutralize the effect of the winding 34, and thus lower the voltage and reduce the output of the generator. One end of the winding 35 is connected to the winding 34 at 36, and also to the contact 21, hereinbefore described, by means of the wire 37, this contact also being connected to the negative pole of the battery 38 by means of a wire 39. The other end of the series winding 35 is connected with contact 20 and to the brush 29 by means of a wire 40. The brush 28 is connected to the shunt winding P and the series winding S of the relay mechanism by a conductor 41, and to the end of the field winding 34 by a conductor 42. The other end of the shunt winding P is connected to the conductor 37. The free end of the series winding S terminates at the contact 14, normally not in engagement with the contact 13, the latter being connected to the positive pole of the storage battery 38 by means of a conductor 43.

The operation of the system and apparatus will now be described. The generator G is positively driven by means of a belt, chain, gears or other approved method, from the crank shaft of the engine of the motorcycle or automobile. It will thus be seen that it will run at widely varying rates of speed, particularly in the case of a gasoline engine, for which my system is especially adapted. Under ordinary conditions, when the generator commences to run, the contacts 20 and 21 being closed, the series winding 35 is inoperative and the shunt winding 34 is at its full efficiency. The generator therefore begins to build up its voltage quite rapidly. As soon as the voltage of the generator reaches a certain amount, usually in the neighborhood of six and a half volts, the shunt winding P of the relay mechanism is sufficiently energized to attract the armature 7 and close the contacts 13 and 14. The circuit for this can be traced from the brush 29, conductor 40, contacts 20 and 21, conductor 37, winding P, conductor 41, to the brush 28, the shunt field winding 34 being electrically in shunt with the winding P and energized by the same set of connections. As the generator speed rises, the voltage increases and current commences to flow through the battery 38 through the following circuit: from the brush 28 by way of the conductor 41 to the series windings S of the relay mechanism, through contacts 14 and 13, conductor 43, to the positive pole of the battery, and from the negative pole back to the brush 29 by way of the conductor 39, contacts 21, 20, and conductor 40. This condition prevails as long as the generator speed and voltage are below a certain amount. When the speed of the generator rises still further, however, the voltage also rising with it, a large amount of current will tend to pass into the battery. The contact screw 25, however, is adjusted so that when a definite amount of current passes through series winding S, the armature 16 will be attracted against the tension of the spring 24, and will open the contacts 20 and 21. When this occurs, current will not flow through the conductor 40, but will be forced through the series field winding 35, which, as before stated, is connected so as to neutralize the effect of the shunt winding 34. As a result, the generator voltage will fall rapidly, and the charging current will be correspondingly reduced to a safe figure. The armature 16 will then fall back and close the contacts 20 and 21, short-circuiting the bucking winding 35, and the generator voltage will again build up. Excess current will flow through the winding S, and again open the contacts 20 and 21; this cycle of operations being repeated as long as the generator speed is high enough. In practice, after the generator speed reaches a certain figure, the contacts 20 and 21 are continually opening and closing. When the generator speed falls below a certain amount, its voltage will be too low to charge the battery, and current will tend to flow from the battery to the generator. When this occurs, however, this current, which must of necessity pass through the series winding S of the relay mechanism, will operate to neutralize the effect of the shunt winding P, the armature 7 will be released, open the contacts 13 and 14, and the battery will be disconnected. It will be seen that the shunt winding P of the relay mechanism is not connected permanently across the brushes of the dynamo, but at a point electrically between the series winding S and one brush on one side of the line, and between the battery and the regulating contacts on the other side of the line, and is therefore not affected by changes in the relation of the regulating contacts or fluctuations of current in the series winding 35.

It will readily be seen that the use of my system is not limited to a generator of the electromagnetic type. A magneto-type generator with a single bucking winding could be used with equal facility. It is obvious that my apparatus could also be used with direct-current generators with any number of poles or field windings.

I do not limit myself to the details shown except in so far as they are made the subject of specific language in the appended claims.

I claim:

1. In a battery-charging system, the combination of a storage battery, a direct-current generator provided with a shunt field winding, and a series field winding operating to reduce the field of the generator when current passes through it in a direction to charge the battery, contacts normally short-circuiting said series winding, and means for opening said contacts controlled by the charging current, the shunt winding of the generator being connected electrically between the battery and the short-circuiting contacts.

2. In a battery-charging system, the combination of a storage battery, a direct-current generator provided with a series field winding operating to reduce the field of the generator when current passes through it in a direction to charge the battery, contacts normally short-circuiting said winding, means for opening said contacts controlled by the charging current, a shunt field winding connected electrically between the battery and the short-circuiting contacts, contacts effecting closure of the battery circuit, and a shunt relay connected across said shunt field winding controlling said battery contacts.

3. In a battery-charging system, the combination with a storage battery, of a direct-current generator provided with a series field winding operating to reduce the field of the generator when current passes through it in a direction to charge the battery, contacts normally short-circuiting said winding, means for opening said contacts controlled by the charging current, a shunt field winding connected electrically between the battery and the short-circuiting contacts, a shunt relay connected across said shunt field, contacts controlled by said shunt relay for effecting closure of the battery circuit, and means for opening said contacts controlled by the discharge current.

In witness whereof, I hereunto subscribe my name this 16th day of October, A. D., 1913.

ALFRED RICHTER.

Witnesses:
SADIE M. RYAN,
JAMES R. OFFIELD.